US 6,416,036 B2

(12) United States Patent
Yagi et al.

(10) Patent No.: US 6,416,036 B2
(45) Date of Patent: Jul. 9, 2002

(54) SEALING ARRANGEMENT BETWEEN FLOW REGULATOR AND SHUT-OFF VALVE ATTACHED TO OXYGEN CYLINDER

(75) Inventors: Yutaka Yagi, Iwakuni; Katsuhiko Okada, Hino; Yoichi Yoshida, Tokyo, all of (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/772,984

(22) Filed: Jan. 31, 2001

(30) Foreign Application Priority Data

| Jan. 31, 2000 | (JP) | ................................. 2000-021594 |
| Jan. 31, 2000 | (JP) | ................................. 2000-021595 |
| Feb. 3, 2000 | (JP) | ................................. 2000-026010 |

(51) Int. Cl.⁷ ..................... G05D 16/04; A61M 16/20; A62B 9/04
(52) U.S. Cl. ................. 251/151; 137/507; 128/205.24; 277/919
(58) Field of Search ................ 251/148, 151; 137/505, 507; 128/205.24; 277/919

(56) References Cited

U.S. PATENT DOCUMENTS

| 3,147,761 A | * | 9/1964 | Lecocq ................. 128/205.24 |
| 4,142,973 A | * | 3/1979 | Kachman ................. 137/554 |
| 4,292,841 A | * | 10/1981 | Wesley .................... 73/115 |
| 4,810,187 A | * | 3/1989 | Nitta ..................... 431/255 |
| 5,190,030 A | * | 3/1993 | Semeia ............. 128/205.24 X |
| 5,704,589 A | * | 1/1998 | Canuteson ............. 251/148 X |
| 5,746,198 A | * | 5/1998 | Taba et al. .......... 128/205.24 X |
| 5,775,368 A | * | 7/1998 | Morino ..................... 137/375 |
| 5,785,050 A | * | 7/1998 | Davidson et al. ....... 128/205.24 |
| 5,899,223 A | * | 5/1999 | Shuman, Jr. ............ 251/148 X |
| 5,921,234 A | * | 7/1999 | Garofalo ............ 128/205.24 X |
| 6,082,396 A | * | 7/2000 | Davidson ..................... 137/505 |
| 6,109,794 A | * | 8/2000 | Bertetti et al. .......... 277/919 X |
| 6,116,242 A | * | 9/2000 | Frye et al. .......... 128/205.24 X |
| 6,158,457 A | * | 12/2000 | Byrd et al. ............. 137/507 X |

* cited by examiner

Primary Examiner—William C. Doerrler
Assistant Examiner—Eric Keasel
(74) Attorney, Agent, or Firm—Rader, Fishman and Grauer, PLLC (57) ABSTRACT

The present invention provides a sealing arrangement between a flow regulator and a shut-off valve attached to an oxygen cylinder. The shut-off valve includes a casing which is adapted to be mounted to an oxygen cylinder containing oxygen gas or an oxygen enhanced gas, a side wall defining a part of the casing. A female outlet port is defined in the side wall of the casing. The flow regulator includes a metallic cylindrical body which has first and second end faces. A yoke extends from the first end face of the cylindrical body. A screw bolt, which has an end facing the first end face of the cylindrical body, operates with the yoke to clamp the casing of the shut-off valve between the first end face of the cylindrical body and the end of the screw bolt. A male inlet port extends from the first end face of the cylindrical body into the female outlet port of the shut-off valve to receive the oxygen gas or the oxygen enhanced gas. An o-ring is provided around the inlet port of the flow regulator so that the o-ring is clamped between the first end face of the cylindrical body of the flow regulator and the casing of the shut-off valve when the flow regulator is secured to the shut-off valve. The sealing member is made of an electrically conductive rubber material.

11 Claims, 10 Drawing Sheets

SEALING ARRANGEMENT BETWEEN FLOW REGULATOR AND SHUT-OFF VALVE ATTACHED TO OXYGEN CYLINDER

BACKGROUND OF THE INVENTION

1. Field of the Invention

The invention relates to a sealing arrangement for sealing between a flow regulator and an oxygen cylinder.

2. Description of the Related Art

In treatments for respiratory system diseases such as pulmonary emphysema or chronic bronchitis, oxygen inhalation is known as one of the most effective treatments. A small capacity portable oxygen cylinder is generally used when a patient is out of a hospital or his or her house. The oxygen cylinder contains high pressure oxygen gas and is provided with a shut-off valve. A flow regulator, for controlling the oxygen flow to the patient, is connected to the shut-off valve with an o-ring or a sealing member clamped therebetween. A metallic protection ring is provided around the o-ring. When the oxygen gas contained in an oxygen cylinder is exhausted or almost exhausted, the oxygen cylinder is replaced with a new one. The shut-off valve is closed and the flow regulator is detached from the shut-off valve. At that time, if the on-off valve is closed, a substantial volume of oxygen gas, which is filled within the flow regulator, blows out of it when the flow regulator is detached from the shut-off valve of the oxygen cylinder. Detachment of the flow regulator deforms the o-ring clamped between the flow regulator and the shut-off valve which results in electrostatic charge in the o-ring. The static electricity charged in the o-ring induces electric potential in the metallic protection ring relative to the shut-off valve and the flow regulator. A spark may be generated between the metallic protection ring and the shut-off valve and/or the flow regulator when the o-ring is apart from the shut-off valve, which may result in an accidental fire if there is combustible material near the oxygen cylinder.

SUMMARY OF THE INVENTION

The invention is directed to solve the prior art problems, and to provide an arrangement for sealing the connection between a shut-off valve attached to an oxygen cylinder and a flow regulator, which arrangement is prevented from an accidental fire due to the discharge of the oxygen gas or oxygen enhanced gas which has been filled in the flow regulator.

According to one feature of the present invention, there is provided an arrangement for sealing between a flow regulator and a shut-off valve attached to an oxygen cylinder. The shut-off valve includes a casing which is adapted to be mounted to an oxygen cylinder containing oxygen gas or an oxygen enhanced gas, a side wall defining a part of the casing. A female outlet port is defined in the side wall of the casing. The flow regulator includes a metallic cylindrical body which has first and second end faces. A yoke extends from the first end face of the cylindrical body. A screw bolt, which has an end facing the first end face of the cylindrical body, operates with the yoke to clamp the casing of the shut-off valve between the first end face of the cylindrical body and the end of the screw bolt. A male inlet port extends from the first end face of the cylindrical body into the female outlet port of the shut-off valve to receive the oxygen gas or the oxygen enhanced gas. A sealing member is provided around the inlet port of the flow regulator so that the o-ring is clamped between the first end face of the cylindrical body of the flow regulator and the casing of the shut-off valve when the flow regulator is secured to the shut-off valve. The sealing member is made of an electrically conductive rubber material.

The sealing member may be an o-ring provided around the inlet port, and a metallic protection member is provided around the o-ring for protecting the o-ring from wear and tear. According to one embodiment, the rubber material preferably has a volumetric resistivity of not more than $1.0 \times 10^{10}$ Ωcm.

According to another feature of the invention, an arrangement for sealing between a flow regulator and a shut-off valve attached to an oxygen cylinder is provided. The shut-off valve includes a casing which is adapted to be mounted to an oxygen cylinder containing oxygen gas or an oxygen enhanced gas. A female outlet and a positioning recess port are defined in the side wall of the casing. The flow regulator includes a metallic cylindrical body which has first and second end faces. A metallic positioning pin extends from the first end of the cylindrical body to engage the positioning recess of the shut-off valve. A yoke extends from the first end of the cylindrical body. A screw bolt, which has an end facing the first end of the cylindrical body, operates with the yoke to clamp the casing of the shut-off valve between the first end face of the cylindrical body and the end of the screw bolt. A male inlet port extends from the first end face of the cylindrical body into the outlet port of the shut-off valve when the flow regulator is attached to the shut-off valve. A sealing member is provided around the inlet port of the flow regulator so that the sealing member is clamped between the first end face of the cylindrical body of the flow regulator and the casing of the shut-off valve when the flow regulator is secured to the shut-off valve. A metallic protection member for protecting the sealing member from wear and tear is provided around the sealing member. The metallic protection member has a thickness which allows the metallic protection member to contact the first end of the cylindrical body of the flow regulator and/or the side wall of the shut-off valve.

The thickness of the metallic protection member is preferably smaller than that of the sealing member and larger than 80% of that of the sealing member. According to an embodiment of the invention, the sealing member may comprise an o-ring provided around the inlet port of the flow regulator, and the metallic protection member comprises a protection ring provided around the o-ring. In this case, the thickness of the sealing member is defined by the diameter of the o-ring. The protection ring may include an inner peripheral groove for snugly holding the o-ring. The inner peripheral groove of the protection ring may have a rounded sectional shape having a radius of curvature larger than that of the section of the o-ring or a polygonal sectional shape.

According to another embodiment of the invention, the metallic protection member comprises a protection plate provided around the o-ring. The protection plate includes a positioning hole engaging the metallic positioning pin of the flow regulator to provide an electric circuit for discharging the static electricity charged in the o-ring.

According to another embodiment of the invention, the metallic protection member comprises a protection ring provided around the o-ring. A metallic clip is provided around the protection ring. The metallic clip includes an arm portion engaging the metallic positioning pin of the flow regulator to provide an electric circuit for discharging the static electricity charged in the o-ring.

DESCRIPTION OF THE DRAWINGS

These and other objects and advantages and a further description will now be discussed in connection with the drawings in which.

DESCRIPTION OF THE PREFERRED EMBODIMENTS

Figure 1:
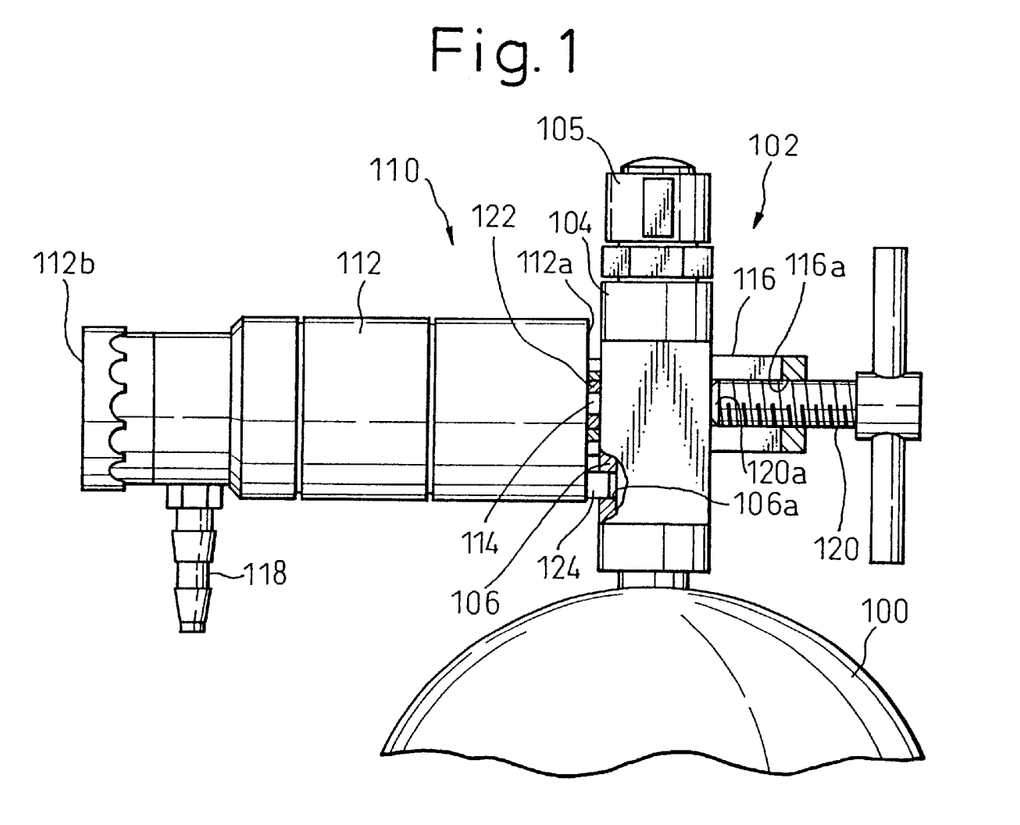
FIG. 1 is a partially sectional illustration of an arrangement of the invention for sealing between a shut-off valve attached to an oxygen cylinder and a flow regulator attached to the shut-off valve.
Figure 2:
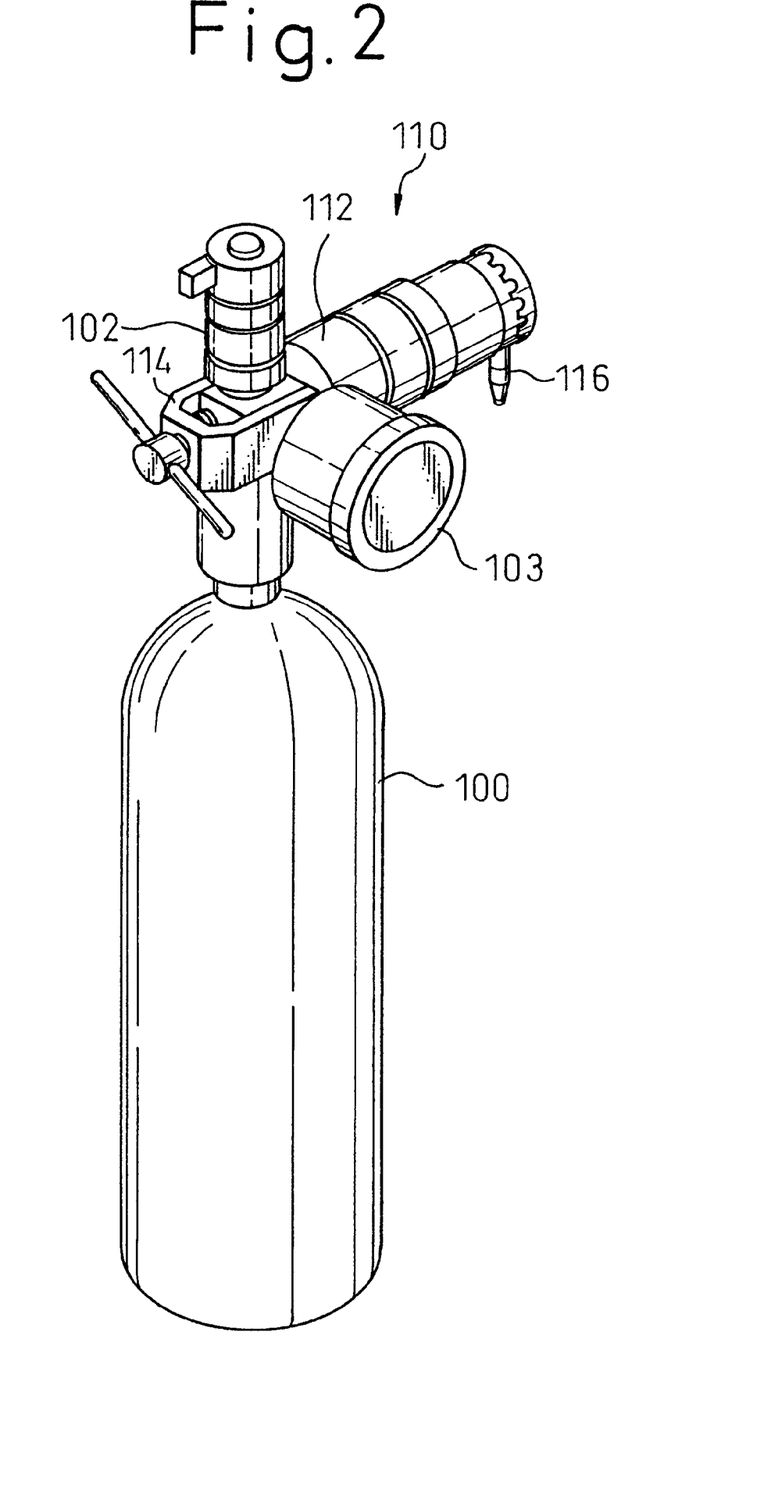
FIG. 2 is a perspective view of the oxygen cylinder, the shut-off valve and the flow regulator.

FIGS. 1 and 2 show an oxygen cylinder 100 which contains high pressure oxygen gas or an oxygen enhanced gas. The oxygen cylinder is provided with a shut-off valve 102 which is adapted to CGA (Compressed Gas Association) 870. The shut-off valve 102 includes a casing 104 for accommodating a valve body (not shown) movable between an open position and a closed position, a cock 105 for manipulating the valve body between the open and closed positions and a pressure gage 103 for indicating the pressure in the oxygen cylinder 100. A side wall 106 of the casing 104 includes a pair of positioning recesses 106a for positioning a flow regulator 110 which is attached to the shut-off valve 102. The side wall 106 further includes a outlet port 106b for discharging the oxygen gas when the valve body is in the open position.

The flow regulator 110 includes a cylindrical body 112 having first and second end faces 112a and 112b. An inlet port 114 and a pair of positioning pins 124 extend from the first end face 112a so as to be inserted into the outlet port 106b and the positioning recesses 106a of the shut-off valve 102, respectively, when the flow regulator 110 is attached to the shut-off valve 102. The positioning pins 124 are generally made of a metallic material and, in particular, are made of a stainless steel. The engagement between the metallic positioning pins 124 and the positioning recesses 106a displaces the flow regulator 110 in place relative to the shut-off valve 102. An outlet port 118 is connected to the cylindrical body 112 adjacent the second end face 112b. A yoke 116 is connected to the first end face 112a of the cylindrical body 112. The yoke 116 has a threaded hole 116a with which a screw bolt 120 engages, as shown in FIG. 1. Tightening the screw bolt 120 clamps the shut-off valve 102 between the end 120a of the screw bolt 120 and the first end face 112a of the cylinder body 112 to secure the flow regulator 110 to the shut-off valve 102.

The outlet port 118 is adapted to be fluidly connected, through a conduit or a tube (not shown), to a nasal cannula or a nasal mask (not shown) which is attached to the nose of the patient. An aspiration sensor (not shown) is provided for detecting the aspiration of the patient. The cylindrical body 112 of the flow regulator 110 contains an on-off valve (not shown) which is fluidly connected to the inlet and outlet ports 114 and 118 and operates to fluidly connect and disconnect the inlet and outlet ports 114 and 118 so that the oxygen gas or the oxygen enhanced gas is supplied to the respiratory system of the patient only when an aspiration of the patient is detected by the aspiration sensor.

Figure 3A:
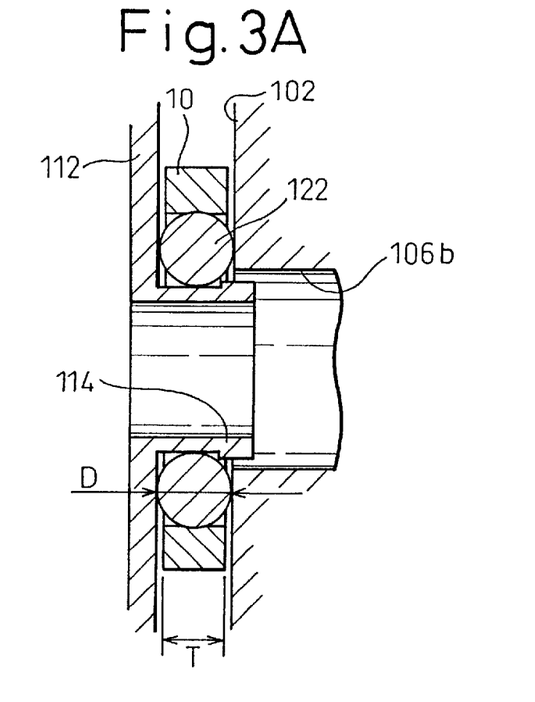
FIG. 3A is an enlarged section of the sealing arrangement according to an embodiment of the invention when a screw bolt of a yoke type clamping means of the flow regulator is not tightened.
Figure 3B:
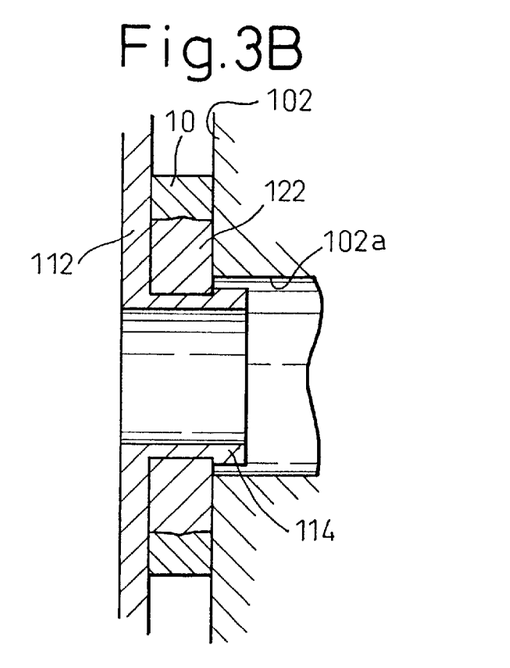
FIG. 3B is an enlarged section similar to FIG. 3A in which the screw bolt is tightened.

Referring to FIGS. 3A and 3B, when the flow regulator 110 is attached to the shut-off valve 102, the inlet port 114 is inserted into the outlet port 106a of the shut-off valve 102, as shown in FIG. 3A. Provided around the inlet port 114 of the flow regulator 110 is a sealing member, in this particular embodiment an o-ring 122 which is clamped between the first end face 112a of the cylindrical body 112 and the side wall 106 of the shut-off valve 102 to seal between the flow regulator 110 and the shut-off valve 102. According to a feature of the invention, the o-ring 122 can preferably be made of an electrically conductive rubber material which has a volumetric resistivity of not more than $1.0-10^{10}$ $\Omega$cm, preferably not more than $1.0 \times 10^7$ $\Omega$cm, and more preferably not more than $1.0 \times 10^6$ $\Omega$cm, for example a fluorocarbon elastomer in which carbon particles are added, as a conductive material, to enhance the conductivity or a chloroprene rubber material. The small volumetric resistivity or the conductivity of the o-ring 122 allows the static electricity charged in the o-ring 122 to be discharged directly to the cylindrical body 112 of the flow regulator 110 and the shut-off valve 102. Therefore, in case the case that the o-ring 122 is made of electrically conductive rubber material, the metallic protection member can be replaced with a protection member made of a high-strength engineering plastic material.

An experiment was executed to measure the static electric voltage induced in the protection ring 10, in which three type of o-rings were used. The o-rings were made of poly (vinylidene fluoride-hexafluoropropylene), available as Viton from DuPont (Example 1); Viton base carbon enhanced fluorocarbon elastomer (Example 2); and chloroprene (Example 3), respectively. The experiment results were shown in Table 1.

TABLE 1

|  | Volumetric Resistivity (Ωcm) (Method of Measurement) | Static Electricity (V) |
| --- | --- | --- |
| Example 1 | $2.5 \times 10^{13}$ (JIS K6911) | 500 |
| Example 2 | Less Than $1.0 \times 10^6$ (JIS K6911) 6.2 (SRIS 2301) | 0 |
| Example 3 | $1.2 \times 10^7$ (JIS K6911) | 0 |

In the experiment, the volumetric resistivity was measured in accordance with JIS K6911 (Ambient temperature 23° C.; relative humidity 50%). In this connection, according to JIS K6911, the static electricity induced in the protection ring could not measured in the case of Example 2 because the static electricity was below the lower measurable limit. Therefore, the measurement was carried out in accordance with SRIS 2301 for Example 2.

Figure 9A:
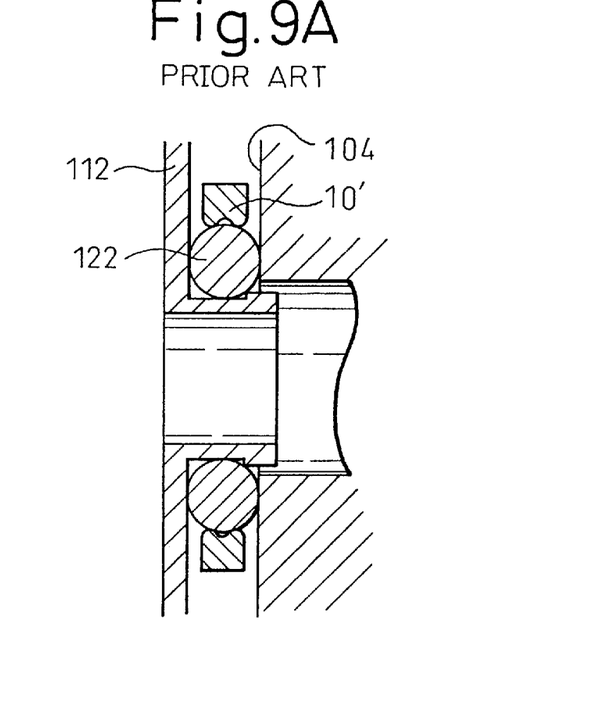
FIG. 9A is a section, similar to FIG. 3A, of the sealing arrangement according to a prior art.
Figure 9B:
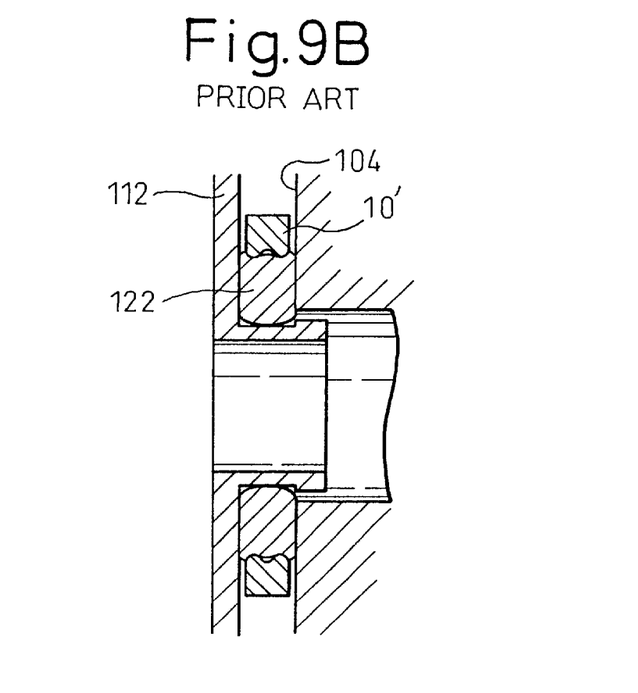
FIG. 9B is an enlarged section, similar to FIG. 3B, of the sealing arrangement according to a prior art.

A metallic protection member, made of brass material, steel material, or aluminum material, is provided around the o-ring 122. In an preferred embodiment, the protection member comprises a protection ring 10. The protection ring 10 preferably has a thickness T which is smaller than the diameter D of the section of the o-ring 122 so that the o-ring can contact both the first end face 112a of the cylinder body 112 of the flow regulator 110 and the side wall 106 of the shut-off valve 102 to provide a sealing effect. The thickness T must be sufficient to allow the protection ring 10 to contact the first end face 112a of the cylinder body 112 of the flow regulator 110 and the side wall 106 of the shut-off valve 102, as shown in FIG. 3B, when the screw bolt 120 is tightened to attach the flow regulator 110 to the shut-off valve. This allows the protection ring 10 to be grounded to the cylindrical body 112 of the flow regulator 110 and/or the shut-off valve 102 so that the electric potential induced in the protection ring 10 relative to the flow regulator 110 and the shut-off valve 102 by the static electricity charged in the o-ring 122 is reduced. An experiment shows that a thickness T of the protection ring 10 larger than 80% of the thickness of the sealing member or the diameter D of the o-ring 122 allows the protection ring 10 to contact the first end face 112a of the cylinder body 112 of the flow regulator 110 and the side wall 106 of the shut-off valve 102. FIGS. 9A and 9B show a prior art, in which an insufficient thickness T' of the protection ring 10' prevents the protection ring 10' from contacting the cylindrical body 112 of the flow regulator 110 or the casing 104 of the shut-off valve 102.

Figure 4A:
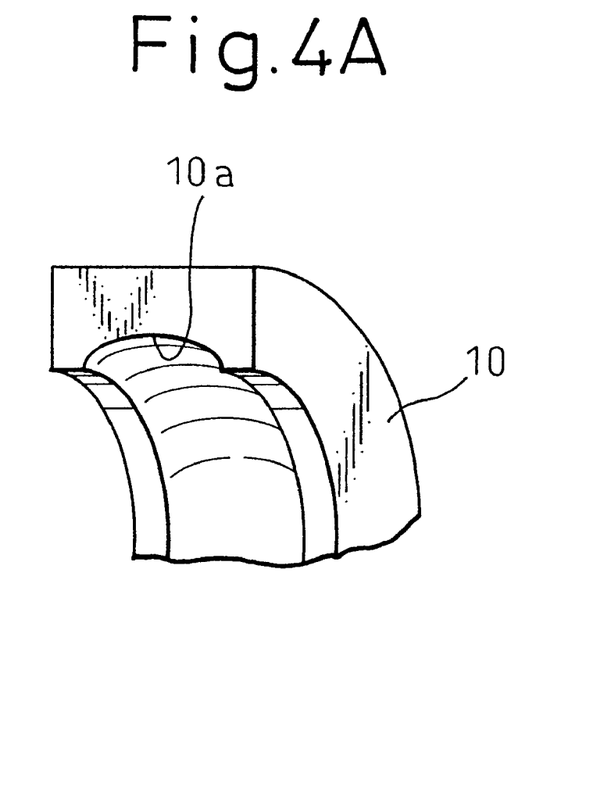
FIG. 4A is a partially sectional perspective view which shows a portion of a protection ring according to an embodiment of the invention.
Figure 4B:
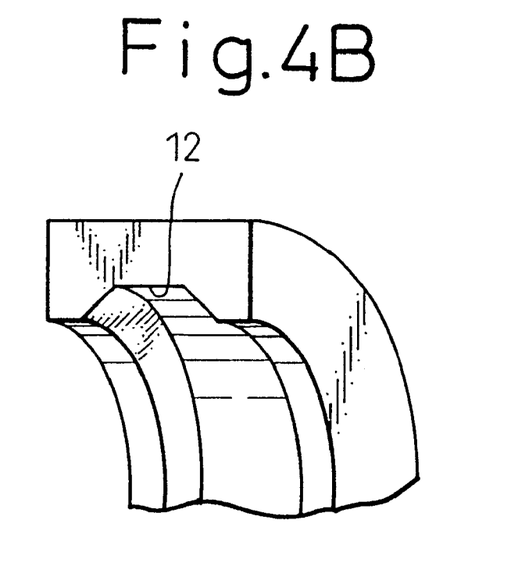
FIG. 4B is a partially sectional perspective view which shows a portion of a protection ring according to another embodiment of the invention

With reference to FIG. 4A, the protection ring 10 includes an inner peripheral groove 10a for snugly holding the o-ring 122. The inner peripheral groove 10a has a rounded section, as shown FIG. 4A. However, the shape of the inner peripheral groove is not limited to this and may be formed into a polygonal shape, for example a trapezoid shape, as shown by reference "12" in FIG. 4B.

In the previous embodiments, the protection member is formed into a ring. However, the present invention is not limited to this configuration.

Figure 5A:
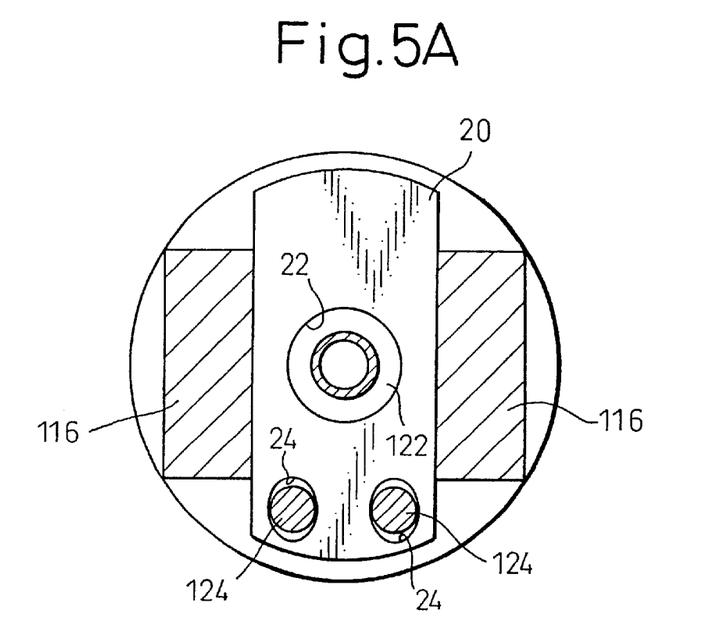
FIG. 5A is a front view of the sealing arrangement of an embodiment of the invention along line V—V in FIG. 5B.
Figure 5B:
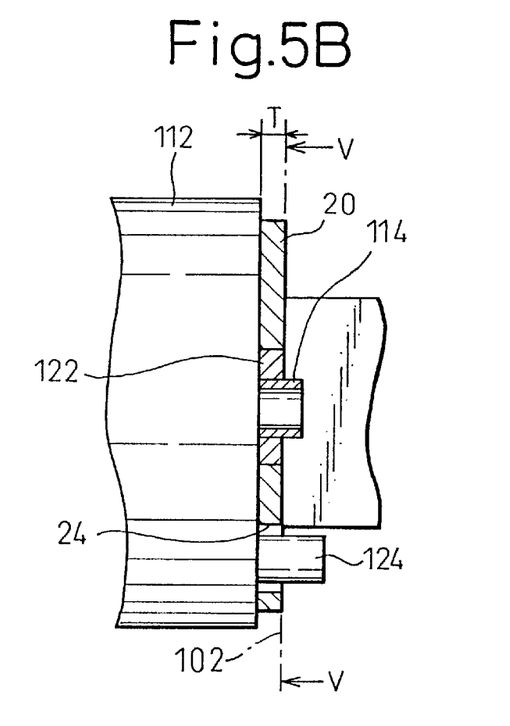
FIG. 5B is a section of the sealing arrangement of FIG. 5A.

With reference to FIGS. 5A and 5B, a modified embodiment of the protection member is shown. In the embodiment shown in FIG. 5A, the protection member comprises a protection plate 20 which includes a central hole 22 for receiving the o-ring 122 and a pair of positioning holes 24 for receiving the metallic positioning pins 124. Engagement between the metallic positioning pins 124 and the positioning holes 24 displaces the protection plate 20 relative to the flow regulator 110 and the shut-off valve 102. Engagement therebetween further provides a ground circuit for the protection plate 20 to the flow regulator 110 and the shut-off valve 102 through the metallic positioning pins 124. The electric potential induced in the protection plate 20 relative to the flow regulator 110 and the shut-off valve 102 by the static electricity charged in the o-ring 122 is reduced through the ground circuit. This configuration is advantageous when the cylindrical body 112 of the flow regulator 110 and/or the shut-off valve 102 is a made of non-electrically-conductive material. In particular, when the cylindrical body 112 of the flow regulator 110 and/or the shut-off valve 102 is made of aluminum material, their surfaces are often coated by an aluminum oxide which prevents the conductivity of the cylindrical body 112 of the flow regulator 110 and/or the shut-off valve 102. Even in that case, the ground circuit provided by the engagement between the positioning holes 24 and the metallic positioning pins 124 reduces the electric potential induced in the protection plate 20. Therefore, a spark is prevented when the flow regulator 110 is detached from the shut-off valve 102. In this connection, according to this embodiment, the thickness of the protection plate 20 must be smaller than that of the o-ring 122, however, it is not required to be larger than 80% of that of the o-ring 122.

Figure 6A:
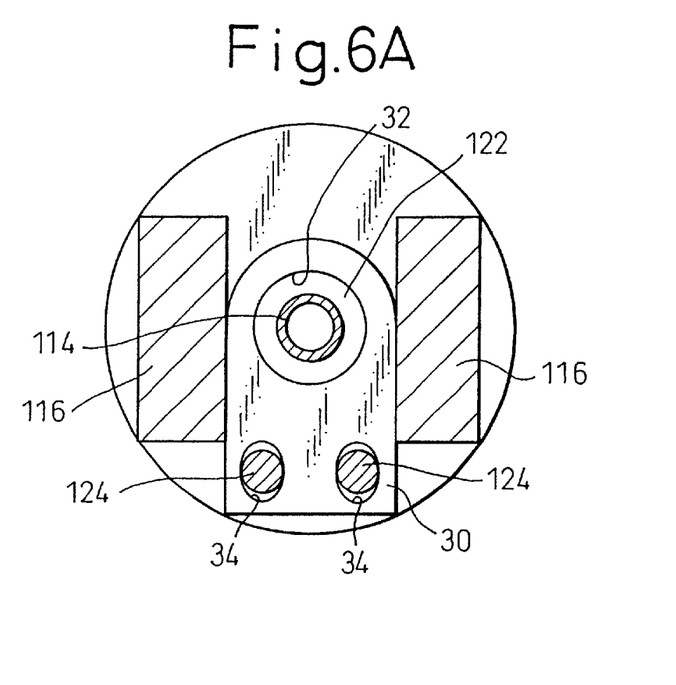
FIG. 6A is a front view of the sealing arrangement of another embodiment of the invention along line VI—VI in FIG. 6B.
Figure 6B:
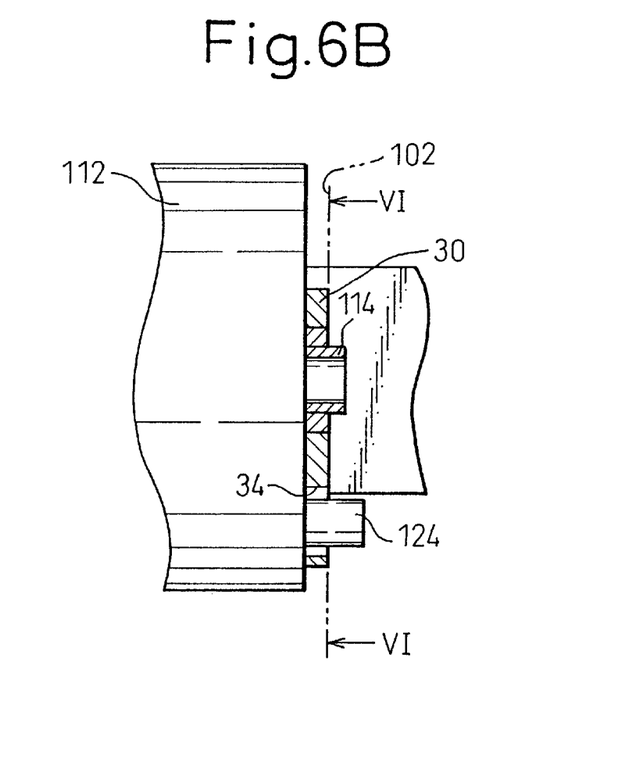
FIG. 6B is a section of the sealing arrangement of FIG. 6A.

In an embodiment shown in FIGS. 6A and 6B, the protection member comprises a protection plate 30. The protection plate 30 includes a central hole 32 for receiving the o-ring 122 and a pair of positioning holes 34 for receiving the metallic positioning pins 124. Engagement between the metallic positioning pins 124 and the positioning holes 34 displaces the protection plate 30 and provides an electric circuit for discharging the static electricity charged in the o-ring 122 from the o-ring 122 to the flow regulator 110 and the shut-off valve 102 through the protection plate 30 and the metallic positioning pins 124. In this connection, according to this embodiment, the thickness of the protection plate 30 must be also smaller than that of the o-ring 122, however, it is not required to be larger than 80% of that of the o-ring 122.

Figure 7A:
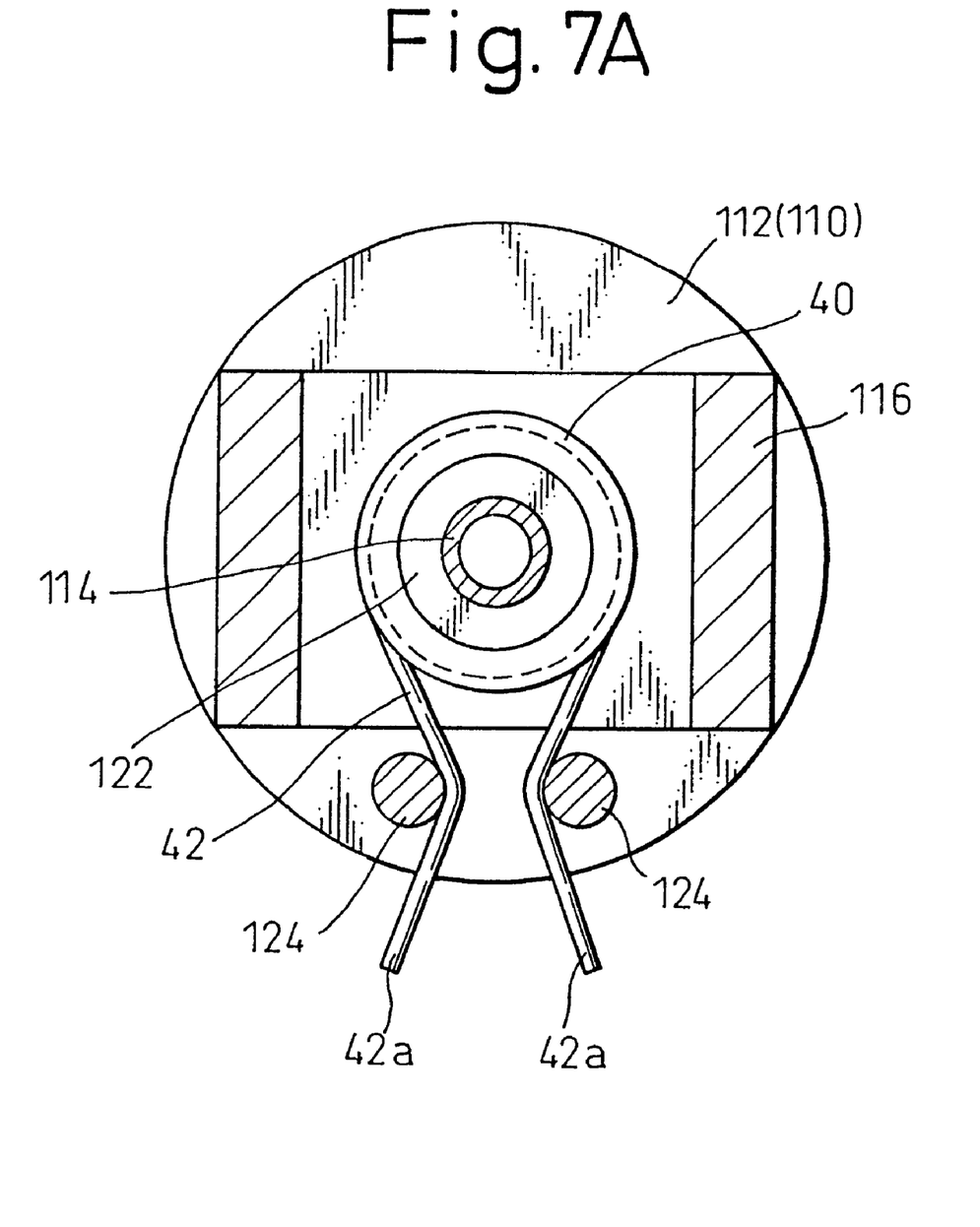
FIG. 7A is a front view of the sealing arrangement of another embodiment of the invention along line VII—VII in FIG. 7B.
Figure 7B:
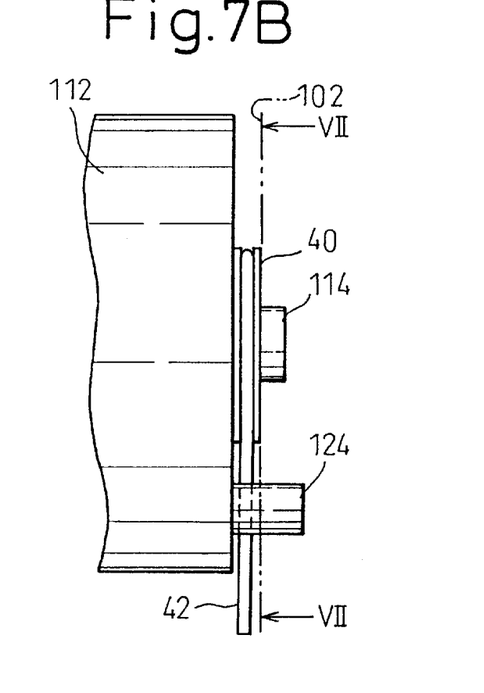
FIG. 7B is a side view of the sealing arrangement of FIG. 7A.
Figure 7C:
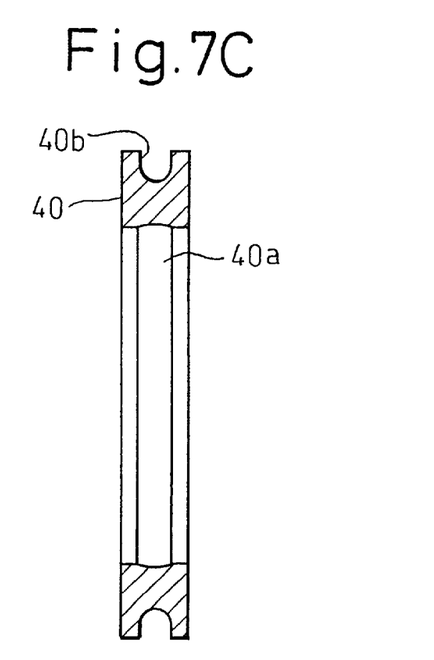
FIG. 7C is a section of a protection ring of the embodiment shown in FIGS. 7A and 7B.

FIGS. 7A–7C show another embodiment of the protection member. In this embodiment, the protection member comprises a protection ring 40. The protection ring 40 includes an inner peripheral grove 40a for snugly holding the o-ring 122 and a outer peripheral groove 40b for engagement with a metallic clip 42. The metallic clip 42 are preferably made of a stainless steel spring material, and includes arm portions 42a which are adapted to engage the metallic positioning pins 124. According to this embodiment, engagement between the arm portions 42a and the metallic positioning pins 124 displaces the protection ring 40 and provides a ground circuit for the protection ring 40 to the flow regulator 110 and the shut-off valve 102 through the metallic clip 42 and the positioning pins 124. In this connection, according to this embodiment, the thickness of the protection ring 40 must be also smaller than that of the o-ring 122, however, it is not required to be larger than 80% of that of the o-ring 122.

Figure 8:
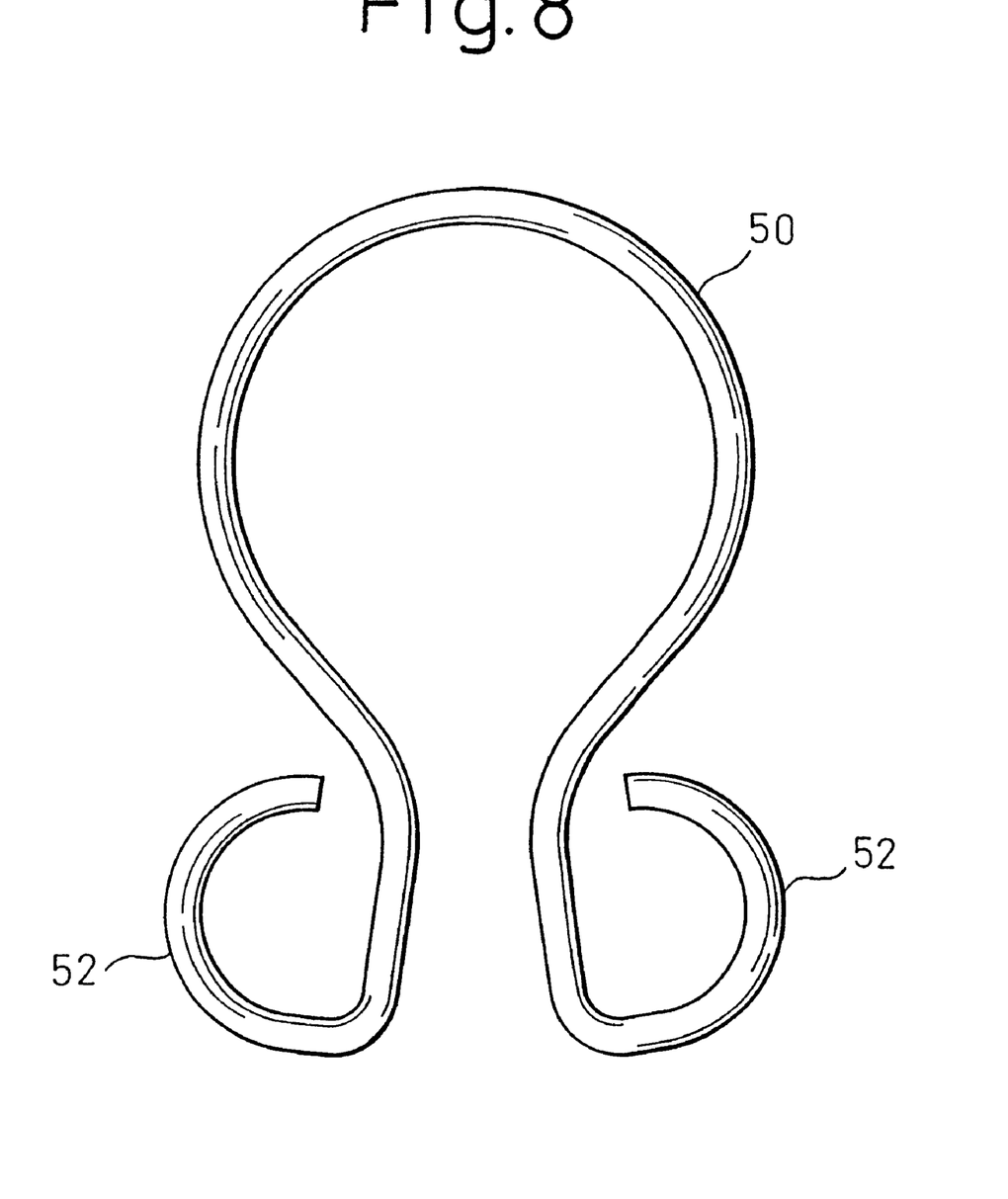
FIG. 8 is front view of a clip according to an embodiment of the invention.

FIG. 8 shows another embodiment, in which the metallic clip 42 is replaced with a metallic clip 50. The metallic clip 50 has a pair of arm portions 52 which are adapted to be rounded around the metallic positioning pins 24 when the metallic clip 50 is assembled to the flow regulator 110.

It will also be understood by those skilled in the art that the forgoing description is a preferred embodiment of the disclosed device and that various changes and modifications may be made without departing from the spirit and scope of the invention.

We claim:

1. An arrangement for sealing between a flow regulator and a shut-off valve attached to an oxygen cylinder, the shut-off valve including a casing which is adapted to be mounted to an oxygen cylinder containing oxygen gas or an oxygen enhanced gas, a side wall defining a part of the casing, a female outlet port defined in the side wall of the casing, the flow regulator including a metallic cylindrical body having first and second end faces, a yoke extending from the first end face of the cylindrical body, and a screw bolt having an end facing the first end face of the cylindrical body, the screw bolt operated with the yoke to clamp the casing of the shut-off valve between the first end face of the cylindrical body and the end of the screw bolt, the arrangement comprising;

a male inlet port, extending from the first end face of the cylindrical body, for receiving the oxygen gas or the oxygen enhanced gas from the outlet port of the shut-off valve when the flow regulator is attached to the shut-off valve; and a sealing member, provided around the inlet port of the flow regulator so that the sealing member is clamped between the first end face of the cylindrical body of the flow regulator and the casing of the shut-off valve when the flow regulator is secured to the shut-off valve, for sealing between the inlet port and the casing of the shut-off valve around the outlet port, the sealing member being made of an electrically conductive rubber material.

2. An arrangement according to claim 1, wherein the rubber material has a volumetric resistivity of not more than $1.0 \times 10^{10}$ Ωcm.

3. An arrangement according to claim 1, wherein the sealing member comprises an o-ring provided around the inlet port;

the arrangement further comprising a metallic protection member, provided around the o-ring, for protecting the o-ring from wear and tear; and the o-ring being made of a rubber material having a volumetric resistivity of not more than $1.0 \times 10^{10}$ Ωcm.

4. An arrangement for sealing between a flow regulator and a shut-off valve attached to an oxygen cylinder, the shut-off valve including a casing which is adapted to be mounted to an oxygen cylinder for containing oxygen gas or an oxygen enhanced gas, a side wall defining a part of the casing, a female outlet port defined in the side wall of the casing, and a positioning recess defined in the side wall of the casing, the flow regulator including a metallic cylindrical body having first and second end faces, and a metallic positioning pin, extending from the first end of the cylindrical body to engage the positioning recess of the shut-off valve, a yoke extending from the first end of the cylindrical body, and a screw bolt having an end facing the first end of the cylindrical body, the screw bolt operated with the yoke to clamp the casing of the shut-off valve between the first end face of the cylindrical body and the end of the screw bolt, the arrangement comprising;

a male inlet port, extending from the first end face of the cylindrical body, for receiving the oxygen gas or the oxygen enhanced gas from the outlet port of the shut-off valve when the flow regulator is attached to the shut-off valve;

a sealing member, provided around the inlet port of the flow regulator so that the o-ring is clamped between the first end face of the cylindrical body of the flow regulator and the casing of the shut-off valve when the flow regulator is secured to the shut-off valve, for sealing between the inlet port and the casing of the shut-off valve around the outlet port; and a metallic protection member, provided around the sealing member, for protecting the sealing member from wear and tear, the metallic protection member having a thickness which allows the metallic protection member to contact the first end of the cylindrical body of the flow regulator and/or the side wall of the shut-off valve.

5. An arrangement according to claim 4, wherein the thickness of the metallic protection member is smaller than that of the sealing member and larger than 80% of that of the sealing member.

6. An arrangement according to claim 5, wherein the sealing member comprises an o-ring provided around the inlet port of the flow regulator, and the metallic protection member comprises a protection ring provided around the o-ring.

7. An arrangement according to claim 6, wherein the protection ring includes an inner peripheral groove for snugly holding the o-ring.

8. An arrangement according to claim 7, wherein the inner peripheral groove of the protection ring has a rounded sectional shape having a radius of curvature larger than that of the section of the o-ring.

9. An arrangement according to claim 7, wherein the inner peripheral groove of the protection ring has a polygonal sectional shape.

10. An arrangement according to claim 4, wherein the sealing member comprises an o-ring provided around the inlet port of the flow regulator; and the metallic protection member comprising a protection plate provided around the o-ring, the protection plate including a positioning holes engaging the metallic positioning pin of the flow regulator to provide an electric circuit for discharging the static electricity charged in the o-ring.

11. An arrangement according to claim 4, wherein the sealing member comprises an o-ring provided around the inlet port of the flow regulator;

the metallic protection member comprising a protection ring provided around the o-ring; and the arrangement further comprising a metallic clip provided around the protection ring, the metallic clip including an arm portion engaging the metallic positioning pin of the flow regulator to provide an electric circuit for discharging the static electricity charged in the o-ring.

* * * * *